United States Patent Office 3,181,982
Patented May 4, 1965

3,181,982
GEL PROPELLANTS COMPRISING HALOGEN-CONTAINING TERPOLYMERS
Charles H. Burnside and Claude G. Long, Bartlesville, Okla., assignors to Phillips Petroleum Company, a corporation of Delaware
No Drawing. Filed Apr. 29, 1959, Ser. No. 809,873
19 Claims. (Cl. 149—19)

This application relates to gel propellants. In one aspect this invention relates to solid or semi-solid gel propellants prepared by adding a gelling agent to a liquid nitroalkane or mixtures of liquid nitroalkanes.

One of the advantages for the use of solid propellants over liquid propellants is that fuel injectors, leak proof tanks, pumps, pipes or tubes, meters, and complicated controls are not required. Such items contribute to the dead weight of a rocket motor or missile and are the source of operational difficulties. Solid propellants of the composite type comprising one or more solid oxidizers uniformly dispersed in a rubbery binder have met with widespread application. In the preparation of composite type propellants it has not been generally feasible to utilize a major amount of any one liquid component unless the liquid could be incorporated in the other solid components present. For example, minor amounts of liquid plasticizers have been used with rubbery polymers, and the thermosetting or curable liquid polymers have been used in the preparation of binders with solid oxidizers. Thus, many potentially valuable liquid propellant ingredients cannot be readily employed as the major ingredient of a composite type propellant, or used in a manner analogous to solid propellants.

We have discovered it is possible to produce a homogeneous semi-solid or solid gel from liquid nitroalkanes by contacting said alkanes with a fluorine-containing or fluoropolymer, defined further hereinafter. Since in the resulting gel mixture both the nitroalkane and the fluoropolymer are oxidizers, the gelled mixture can be referred to as an oxidizer gel and it is desirable to include or incorporate in the gelled mixture a fuel component capable of being oxidized by said oxidizer, i.e., said nitroalkane and said fluoropolymer. Thus, broadly speaking, the present invention resides in a mixture comprising a fluoropolymer (defined further hereinafter), at least one nitroalkane, and a fuel component capable of being oxidized by said fluoropolymer and said nitroalkane.

An object of this invention is to provide a solid or semi-solid gel propellant prepared by adding a gelling agent to a liquid nitroalkane or mixtures of liquid nitroalkanes. Another object of this invention is to use a fluoropolymer as a gelling agent for nitroalkanes. Another object of this invention is to provide a propellant gel produced from high energy liquid fuels and oxidizers. Still another object of this invention is to provide a propellant gel produced from high energy liquid fuels which can be used in a manner analogous to solid propellants. Other aspects, objects, and advantages of the invention will be apparent to those skilled in the art in view of this disclosure.

Thus, according to the invention there is provided a composition of matter comprising a mixture of, in weight percent: from about 5 to about 55 percent of a first oxidizer component selected from the group of polymers consisting of solid cross-linked terpolymers formed by copolymerizing from 35 to 70 mol percent of chlorotrifluoroethylene with from 10 to 35 mol percent vinylidene fluoride and 15 to 40 mol percent of hexafluoropropylene, based on total mols of combined monomers; from 40 to 90 percent of a second oxidizer component selected from the group consisting of normally liquid nitroalkanes containing from 1 to 4 carbon atoms per molecule and having an average of at least one nitro group per atom of carbon, and liquid mixtures of nitroalkanes containing from 1 to 4 carbon atoms per molecule where in the mixture there is an average of at least one nitro group per atom of carbon; and from 5 to 35 percent of a combustible fuel component capable of being oxidized by said oxidizer components.

The fluoropolymers used as gelling agents in the practice of the invention are solid cross-linked terpolymers prepared from a mixture of chlorotrifluoroethylene, vinylidene fluoride, and hexafluoropropylene, and will contain in combined form from 35 to 70 mol percent of said chlorotrifluoroethylene, from 10 to 35 percent of said vinylidene fluoride, and from 15 to 40 mol percent of said hexafluoropropylene. Said polymers preferably have a degree of cross-linking within the range of from about $1 \times 10^{-5}$ to $1 \times 10^{-3}$ mols of effective chains per milliliter of terpolymer.

The fluoropolymers used in the practice of the invention can be prepared by any suitable method. Various methods are known to those skilled in the art. Both mass and emulsion polymerization processes can be employed. Mass polymerization is generally effected at low temperatures, e.g., $-20°$ to $0°$ C., using a peroxide promoter. Organic peroxides such as trichloroacetyl peroxide are preferred in such systems. Emulsion polymerization is generally effected at temperatures from about 0 to about 35° C. For such emulsion polymerization processes a redox catalyst system gives satisfactory polymerization rates. A persulfate such as potassium persulfate, a bisulfite such as potassium bisulfite, and a metal salt such as ferrous sulfate can comprise said catalyst system.

Many of the polymer products obtained by the above conventional methods of preparation will have a degree of cross-linking within the above-described preferred range. Some cross-linking can be effected during emulsion polymerization, and the extent of said cross-linking during polymerization can be regulated. For example, use of peroxides during emulsion polymerization can promote cross-linking. The polymers can also be cross-linked by treatment subsequent to polymerization by treatment with a peroxide such as cumene peroxide and benzoyl peroxide, and by treatment with zinc oxide. Further details regarding such procedures can be found in U.S. Patents 2,820,776 and 2,833,752.

The theory and procedures relating to the determination of crosslinks are well known. For example, see Flory, "Principles of Polymer Chemistry," pages 576–584, Cornell University Press, Ithaca, New York (1953); Kraus, Rubber World 135, 67–73 and 254–260 (1956); and Mullins, Journal of Polymer Science 19, 225 (1956). One procedure which has been found useful with the fluoropolymers used in the practice of the invention involves mixing the candidate polymer with an equal volume of a plasticizer, such as the liquid polymers of chlorotrifluoroethylene (Kel F No. 1 oil) to produce a swollen gel. The uniform mixture is then molded by heating at temperatures of 90–150° C. so as to form a test specimen of the gel. The specimen is clamped at each end, and the modulus of the specimen is measured as a function of the stress applied. The equilibrium retractive force, $\tau$, in kilograms per unit area of undeformed cross section, is defined by the equation:

$$\tau = \left(RT\frac{v_e}{V}\right)\left(\alpha - \frac{1}{\alpha}\right)$$

where $R = 84.78$ kilograms·cm./g. mol., ° C.
$T =$ absolute temperature, ° K.
$v_e =$ number of mols of cross-links
$V =$ volume of the swollen polymer $\alpha$ = extended length of specimen divided by the original length $V_0$ = volume of unswollen (candidate) polymer The value of $v_e/V$ is used to compute the value of $v_e/V_0$ for the candidate polymer by multiplying $v_e/V$ by the ratio of the volume of the swollen gel to the volume of candidate polymer in the gel.

The nitroalkanes useful in the practice of the invention are those containing from 1 to 4, inclusive, carbon atoms per molecule and having an average of at least one nitro group per carbon atom. Mixtures of said nitroalkanes can also be used. When nitroalkanes are used which have an average of less than one nitro group per atom of carbon, such nitroalkanes are used in conjunction with other nitroalkanes so as to give a mixture averaging at least one nitro group per carbon atom. Said nitroalkanes, when normally liquid, can be used alone or in mixtures with other normally liquid nitroalkanes. When said nitroalkanes are solids they can be used in admixture with a normally liquid nitroalkane to give a liquid mixture. The term "normally liquid" as used herein and in the claims, means liquid at 20–25° C. and atmospheric pressure. Examples of nitroalkanes useful in the practice of the invention include, among others, the following: nitromethane; nitroethane; dinitromethane; trinitromethane; tetranitromethane; 1,2-dinitroethane; 1,1-dinitroethane; 1,1,2-trinitroethane; hexanitroethane; 1-nitropropane; 2-nitropropane; 2,2-dinitropropane; 1,3-dinitropropane; 1,1,1-trinitropropane; octanitropropane; 1,4-dinitrobutane; 1,2,4-trinitrobutane; 1,2,3,4-tetranitrobutane; 1,1,2,2,3,3,4,4-octanitrobutane; and decanitrobutane. The preferred nitroalkanes are those having from one to two carbon atoms per molecule. The most preferred nitroalkanes are tetranitromethane and liquid mixtures comprising a major amount of tetranitromethane in admixture with one or more than other nitroalkanes; said mixtures averaging one or more nitro groups per carbon atom, as described above.

The fuel component in the propellant compositions of the invention can be any fuel material capable of being oxidized by the oxidizing mixture of the fluoropolymer and nitroalkane. Thus, the invention is not limited to any specific fuel as the fuel component of the propellant composition. The invention resides in a gelled nitroalkane, gelled with a fluoropolymer, and having incorporated therein any suitable fuel component.

Examples of fuel components preferred in the practice of the invention include elemental carbon in various forms such as carbon black, graphite, and the like; liquid and solid organic compounds, such as the saturated aliphatic hydrocarbons; organic polymers; organic ketones, such as the alkyl ketones and the aryl ketones, and the like; and alkyl ethers of saturated glycols; and polyalkylene glycols.

Examples of said hydrocarbon fuels which can be used in the practice of the invention include, among others, the following: the normally liquid and normally solid hydrocarbons containing at least five carbon atoms per molecule such as normal pentane, cyclohexane and other cyclic paraffins, octanes, dodecanes, hexadecanes, eicosanes, paraffin wax, liquid polymers of ethylene, solid polymers of ethylene, liquid copolymers of ethylene and propylene, solid copolymers of ethylene and propylene, liquid polymers of propylene, solid polymers of propylene, and the like. Hydrocarbons containing less than five carbon atoms per molecule which are not normally liquid at ordinary temperatures can also be used in the practice of the invention when they are present in solution in said normally liquid or normally solid hydrocarbons. For example, propane and butane can be present in mixture of normally liquid hydrocarbons such as those boiling in the gasoline boiling range or kerosene boiling range, etc.

Examples of said organic ketones which can be used in the practice of the invention include, among others, the following: diethyl ketone; ethyl butyl ketone; methyl isobutyl ketone; dihexyl ketone; hexyl methyl ketone; methyl phenyl ketone (acetophenone); cyclohexanone; and the like. Said ketones also serve to modify the gel properties and in some cases to lower the vapor pressure. Acetophenone is a presently preferred ketone.

Examples of alkyl ethers of saturated glycols which can be used in the practice of the invention include, among others, the following: monomethyl ether of ethylene glycol; monoethyl ether of ethylene glycol; and monopropyl ether of ethylene glycol.

Examples of polyalkylene glycols include those formed by condensation of ethylene glycol; those formed by condensation of propylene glycol; and those formed by condensation of mixtures of ethylene and propylene glycol; and the like.

The above-described propellant composition comprising the fluoropolymer of the invention, at least one nitroalkane as defined above, and a suitable fuel component comprises the base propellant of the invention. Thus, herein and in the claims, unless otherwise specified, the term "base propellant" refers to said three component mixture.

Said base propellant is useful and finds many applications as a rocket propellant and as a charge for gas generator devices. However, it is sometimes desirable to incorporate in said base propellant one or more propellant additives to alter the performance of said base propellant and enhance its performance in specific applications. For example, high energy additives such as finely divided boron, and finely divided metals are sometimes incorporated in said base propellant to increase the specific impulse thereof. Other examples of propellant additives which can be incorporated in said base propellants are: inorganic oxidizing salts as supplemental oxidizers; burning rate catalysts or modifiers to alter or control the burning rate of said propellants; and oxides of nitrogen to lower the freezing point of the nitroalkanes. All of said propellant additives are usually used in amounts ranging from 0 to 25 parts by weight per 100 parts by weight of said base propellant.

Said high energy additives are employed as finely divided powders having a particle size less than about 200 microns. Examples of said high energy additives which can be employed in the practice of the invention include, among others, the following: boron, lithium, beryllium, magnesium, aluminum, calcium, and the like. Powdered hydrides of said high energy additives such as decaborane, beryllium hydride, lithium hydride, lithium-aluminum hydride, aluminum hydride, and the like can also be used in the practice of the invention. Alloys of said metals such as aluminum with magnesium, aluminum with copper, and magnesium with zinc can also be used in the practice of the invention. Powdered carbides of said metals such as aluminum carbide and boron tetracarbide can also be used in the practice of the invention to give useful results. Said powdered high energy additives are frequently employed in conjunction with and as a supplement to an organic fuel component, particularly a liquid organic fuel component such as the ketones. In some instances mixtures of said high energy additives with nitroalkanes are unstable. In such instances the high energy additive can be encapsulated in a suitable material such as paraffin wax, resins, polyethylene and the like which are inert to the nitroalkanes. The encapsulating material stabilizes the propellant composition for storage purposes but enables the composition to burn smoothly in use because under combustion conditions said encapsulating material is removed progressively as combustion proceeds. Any suitable encapsulation or coating technique can be employed. It has been observed that said powdered high energy additives also serve to stiffen the gels.

Solid inorganic oxidizers which are applicable in the propellant compositions of the invention include ammonium perchlorate, the alkali metal perchlorates, ammonium nitrate, and the alkali metal nitrates. As used herein, the term "alkali metal" includes sodium, potassium, lithium, cesium, and rubidium. Ammonium nitrate and ammonium perchlorate are the presently preferred solid inorganic oxidizers. Mixtures of said inorganic oxidizers are also applicable. When ammonium nitrate is used as the solid inorganic oxidizer, it is frequently preferred to use a phase stabilized ammonium nitrate. One method of phase stabilizing ammonium nitrate comprises mixing about 10 parts by weight of a potassium salt (usually potassium nitrate) with about 90 parts by weight of ammonium nitrate along with some water, heating the mixture to about 140–150° F., drying, and then grinding the mixture to the desired particle size. In the preparation of the propellant compositions of the invention said solid inorganic oxidizers are usually ground to a particle size preferably within the range between 20 and 200 microns average particle size. The most preferred particle size is from about 40 to about 60 microns.

Any suitable burning rate catalyst or modifier can be used in the propellant compositions of the invention. It is preferred that said burning rate catalyst or modifier be as finely divided as possible, preferably having a partcile size of less than 20 microns. Examples of said burning rate catalysts or modifiers applicable in the practice of the invention include, among others, the following: ammonium dichromate; iron oxide; copper chromite; Milori blue; and the like. Metal ferrocyanides and ferricyanides can also be used. Ferric ferrocyanides, such as Prussian, Berlin, Hamburg, Chinese, Paris, and Milori blue (mentioned above), soluble ferric ferrocyanides such as soluble Berlin or Prussian blue which contains potassium ferric ferrocyanides and ferric ferrocyanides which have been treated with ammonia, are among the materials which can also be used. Ferrous ferricyanide (Turnbull's blue) is also applicable. Milori blue, mentioned above, is a pigment similar to Prussian blue but having a red tint and is prepared by the oxidation of a paste of potassium ferrocyanide and ferrous sulfate. Other metal compounds such as nickel and copper ferrocyanides can also be employed.

Thus, a general formulation for the propellant compositions of the invention is as follows.

| Base propellant: | Weight percent |
|---|---|
| Polymer | 5–55 |
| Nitroalkane | 40–90 |
| Fuel | 5–35 |
| Propellant additives: | Parts/100 parts of base propellant |
| High energy additive | 0–25 |
| Inorganic oxidizer | 0–25 |
| Burning rate catalyst or modifier | 0–25 |
| Nitrogen oxides | 0–25 |

In the practice of the invention gellation of the nitroalkanes is produced by contacting the fluoropolymer, preferably a polymer having a degree of cross-linking within the above-defined preferred range, with the nitroalkanes. Gel formation is accelerated by suitable mixing of the materials in any suitable manner as, for example, with a piston type plunger used to force the materials through an orifice. The fuel component can be incorporated by mixing with the polymer or with the nitroalkanes prior to contacting of said polymer with nitroalkanes. To incorporate propellant modifiers or additives, such as the types mentioned hereinabove, said modifiers or additives can, if desired, be dispersed in the gelled mixture of polymer and nitroalkanes, or they can be mixed with the polymer, with the nitroalkanes, or part with the polymer and part with the nitroalkanes, prior to gellation.

The following examples will serve to further illustrate the invention.

*Example I*

A chlorotrifluoroethylene/vinylidene fluoride/hexafluoropropylene terpolymer of the invention, as defined above, and having a melt index of 20 milligrams per minute was used to prepare a gelled propellant having the following composition:

| | Percent by weight |
|---|---|
| Polymer | 15 |
| Acetophenone | 15 |
| Tetranitromethane | 70 |

To prepare said propellant 4.95 grams (3 ml.) of tetranitromethane was placed in a 10 ml. glass syringe. In a second syringe there was placed 1.06 grams of said polymer and 1.06 grams of acetophenone. The two syringes were joined tip to tip by means of a small connecting collar. The ingredients in the two syringes were mixed together by moving the plungers in the same direction simultaneously. This was accomplished by means of a motor driven device which moved the plungers at a rate of about two complete strokes a minute. After an initial mixing period of a few minutes the mixture was permitted to remain quiescent overnight and mixing was continued for 1.5 hours the following morning. The resulting mixture was a gel.

Several portions of the propellant composition were expelled into glass cups 5 mm. in diameter and about 13 mm. deep. The samples in the glass cups were each burned in a bomb at room temperature (20–25° C.) and under different nitrogen pressures covering the range from 300 to 1500 p.s.i.g. Burning of the sample was initiated by means of an igniter wire. Burning was indicated by an optical system comprising a lead sulfide cell in one arm of a Wheatstone bridge. As the propellant burned, the rays emitted passed through a quartz window in the bomb and onto said lead sulfide cell. A recording was made of the infrared intensity registered by said lead sulfide cell as a function of time. This recording clearly indicated the duration of the burning and was used to compute the burning rate. Graphs of the burning rate, $r$, versus pressure were prepared and a smooth curve drawn to represent the results and to obtain the burning rate at 600 p.s.i.g. These results, together with the pressure exponent, $n$, of the burning rate equation $r = ap_c^n$, are given in the tabulation below:

| | |
|---|---|
| $r$ at 600 p.s.i.g., in./sec. | 0.315 |
| $n$ at 600 p.s.i.g. | 0.72 |

The propellant composition burned smoothly in the glass cup and left little or no residue.

*Example II*

Three additional gel propellants using the same fluoropolymer as in Example I were prepared and tested in substantially the same manner as described in said Example I. The aluminum powder was incorporated into propellant No. 3 by mixing with the acetophenone. The resulting dispersion was then mixed with the polymer. Similarly, the Milori blue and the copper chromite in propellants 1 and 2 were added to the polymer. These propellants had the following compositions and burning rate properties:

| | Parts by Weight | | |
|---|---|---|---|
| Propellant Composition No. | 1 | 2 | 3 |
| Polymer | 14.7 | 14.7 | 6.1 |
| Acetophenone | 14.7 | 14.7 | 21.9 |
| Tetranitromethane | 68.8 | 68.8 | 65.5 |
| Milori blue | 1.9 | | |
| Aluminum powder [1] | | | 6.6 |
| Copper chromite [2] | | 1.9 | |
| Burning rate at 600 p.s.i.g. | 0.39 | 0.425 | 0.36 |
| Pressure exponent, $n$ | 0.78 | 0.92 | 0.82 |

[1] Particle size of six microns.
[2] A commercial catalyst available from Harshaw Chemical Company; contains 82% CuO and 17% $Cr_2O_3$.

*Example III*

A terpolymer of the invention having a melt index of 9 milligrams per minute and containing in combined form 56 mol percent of chlorotrifluoroethylene, 21 mol percent of vinylidene fluoride, and 23 mol percent of hexafluoropropylene, and having a degree of cross linking of $2.2 \times 10^{-4}$ mols per milliliter of polymer, was used to prepare two additional gel propellants. Said propellants were prepared in substantially the same manner as described above in Example I except that after the ingredients had been placed in the syringes and the solid ingredients were contacted with the liquid ingredients, there was no other initial mixing. The mixture was then allowed to remain quiescent overnight. The next morning the mixture was mixed for 1½ hours to produce a uniform gel. The composition of said propellants and burning rate tests thereon are given below. The burning rates were determined in the manner described in Example I.

|  | Parts by Weight | |
| --- | --- | --- |
| Propellant Composition No. | 1 | 2 |
| Ingredients: | | |
| Polymer | 15 | 4.7 |
| Acetophenone | 15 | 31.3 |
| Tetranitromethane | 70 | 64.0 |
| Burning rate @ 600 p.s.i. | 0.32 | 0.135 |
| Pressure exponent, $n$ | 0.86 | 1.5 |

*Example IV*

An additional gel propellant was prepared in the same manner as described in Example III above but using the terpolymer of Example I. The composition and tests on this propellant are given below. The burning rates were determined in the same manner as described in Example I.

Propellant composition:
Ingredients—
    Polymer _____ parts by weight__ 5
    Acetophenone _____ do____ 25
    Tetranitromethane _____ do____ 50
    Ammonium perchlorate _____ do____ 20
    Burning rate @ 600 p.s.i. _____ 0.262
    Pressure exponent, $n$ _____ 1.2

*Example V*

Three separate propellant compositions were prepared in substantially the same manner as described above in Example I. The composition of these propellant gels was as follows:

|  | Parts by Weight | Weight Percent |
| --- | --- | --- |
| Polymer | 10.6 | 10.2 |
| Acetophenone | 19.4 | 18.7 |
| Tetranitromethane | 70.0 | 67.5 |
| Aluminum powder | 3.7 | 3.6 |

A separate portion of each gel, weighing from 20 to 30 grams, was placed in a stainless steel cup so as to form a propellant "grain" having a diameter of about 1.5 inches and a length of about 0.5 to 0.7 inch. Each cup containing the gel was axially centered in a rocket motor having a combustion chamber 1.96 inches in diameter and 3.5 inches in length. Said combustion chamber was affixed to a nozzle having a throat diameter of 0.121 inch. The motor was equipped with a pressure transducer, with connecting means for recording of the pressure-time curve during firing, and electrical connections for igintion of a squib (electric match). The squib, in turn, was used to ignite two grams of a pyrotechnic igniter mix which was placed on the surface of the gel propellant.

The propellants were fired successfully in said rocket motor. The pressure-time curves were slightly progressive indicating but a small increase in the area of the burning surface during firing. The characteristic exhaust velocity, $c^*$, was computed by use of the equation:

$$c^* = \int \frac{p \cdot dt \cdot A_t \cdot g}{w}$$

where $p$ = effective chamber pressure
$A_t$ = nozzle throat area
$g$ = 32.2
$w$ = propellant weight, lb.
$dt$ = time increment The $c^*$ values for said three "grains" were 4410, 4490 and 4620. These $c^*$ values are smaller than would be obtained in larger scale firings since a relatively large fraction of the energy is lost in heating the rocket motor.

*Example VI*

A measure of the sensitivity to impact of the gelled propellant of Example V was obtained by placing a portion of said propellant in a cup shaped depression in a steel plate so as to form a sample having a diameter of 0.25 inch and a thickness of 0.05 inch, and then dropping a four pound steel ball onto a Stellite plunger placed on top of the propellant in said depression. The height in inches from which the ball could be dropped ten times without detonation of the propellant is designated as the sensitivity to impact. The composition tested had an impact sensitivity greater than five. The exact value above five was not determined.

*Example VII*

The excellent thermal stability of the oxidizer gels which are prepared in accordance with this invention is illustrated by the following example.

A gelled mixture was prepared by mixing 15 parts by weight of the polymer of Example I and 85 parts by weight of tetranitromethane. This gelled mixture was stored under 20 pounds nitrogen pressure in a glass tube which was connected to a pressure gauge in a closed system. The temperature of the mixture was then maintained at 200° F. for 90 hours. During the test the pressure increased to a maximum value of 85 p.s.i.g. which was attained after about 50 hours. Thereafter, the pressure decreased slowly to about 60 p.s.i.g. and remained approximately constant until termination of the test. At the end of this aging period the color of the mixture had darkened only slightly and the gel remained firm.

The melt index which has been used above to describe the polymers of the invention is a measure of their flow properties under stated conditions. The procedure for determining melt index is described by ASTM D-1238-57P, "Measuring Flow Rates of Thermoplastic by Extrusion Plastometer."

As indicated herein, the present invention relates to the propellant compositions wherein liquid propellant ingredients are used in major proportions in said compositions. Said liquid ingredients are gelled or otherwise converted to a viscous mass. However, such gelled compositions may, under some pressure differential conditions, flow so that by themselves they cannot always be employed per se in the manner of solid propellants. In such instances, or when otherwise desirable, the gelled compositions can be confined or restricted in any suitable manner. For example, in some instances the combustion chamber of the rocket motor can be adapted so that the walls of said chamber serve to confine the gelled composition. In other instances the gelled composition can be confined by restricting or coating all surfaces thereof, except the surface where it is desired that burning take place, with any suitable restricting material which is adhesive to and has a slower burning rate than said composition. Examples of suitable restrictor materials are certain synthetic rubbers such as copolymers of butadiene with 2-ethyl-5-vinylpyridine, ethylcellulose, cellulose acetate, etc. In other instances the gelled composition can be confined in any suitable confining container as described in Example V above.

As used herein and in the claims, unless otherwise specified, the terms "gel propellant," "gelled propellant," "propellant gel," or "oxidizer gel" refer to a composition prepared by mixing together (1) a liquid oxidizer, such as one of the above-defined nitroalkanes, (2) the above-defined terpolymer of the invention, and (3) at least one of the above-defined fuel components to form a gel; it being understood that said gel can, if desired, have at least one of the above-defined propellant additives or modifiers incorporated therein. The gel propellants of the invention are semi-solid or solid organogel systems which exhibit flow only upon the influence of a finite force.

As will be apparent to those skilled in the art, various other modifications of the invention can be made or followed in view of the above disclosure, without departing from the spirit and scope of said invention.

We claim:
1. A gel propellant composition of matter consisting essentially of a mixture of, in weight percent: from about 5 to about 55 percent of a first oxidizer component selected from the group of polymers consisting of solid cross-linked terpolymers formed by copolymerizing from 35 to 70 mol percent of chlorotrifluoroethylene with from 10 to 35 mol percent vinylidene fluoride and 15 to 40 mol percent of hexafluoropropylene, based on total mols of combined monomers; from 40 to 90 percent of a second oxidizer component selected from the group consisting of normally liquid nitroalkanes containing from 1 to 4 carbon atoms per molecule and having an average of at least one nitro group per atom of carbon, and liquid mixtures of nitroalkanes containing from 1 to 4 carbon atoms per molecule where in the mixture there is an average of at least one nitro group per atom of carbon; and from 5 to 35 percent of a combustible fuel component capable of being oxidized by said oxidizer components, said fuel component being selected from the group consisting of elemental carbon and organic compounds.

2. A composition of matter according to claim 1 wherein the degree of cross-linking in said terpolymers is within the range of about $1 \times 10^{-5}$ to $1 \times 10^{-3}$ mols of effective chains per milliliter of terpolymer.

3. A composition of matter according to claim 1 wherein said nitroalkane is tetranitromethane.

4. A composition of matter according to claim 1 wherein said nitroalkane is a mixture consisting of a major amount of tetranitromethane and at least one other nitroalkane.

5. A propellant composition consisting essentially of the mixture of claim 1 as a base propellant and containing up to 25 parts by weight per 100 parts by weight of said base propellant of a finely divided solid inorganic oxidizing salt selected from the group consisting of the ammonium and alkali metal salts of perchloric acid and nitric acid, and mixtures of said salts.

6. A propellant composition consisting essentially of the mixture of claim 1 as a base propellant and containing up to 25 parts by weight per 100 parts by weight of said base propellant of a finely divided high energy additive selected from the group consisting of boron, beryllium, magnesium, aluminum, calcium, alloys of said metals, and carbides of said metals.

7. A propellant composition consisting essentially of the mixture of claim 1 as a base propellant wherein said fuel component is a saturated aliphatic hydrocarbon; and containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

8. A propellant composition consisting essentially of the mixture of claim 1 as a base propellant wherein said fuel component is an organic ketone; and containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

9. A propellant composition consisting essentially of the mixture of claim 1 as a base propellant wherein said fuel component is a lower alkyl ether of a saturated glycol; and containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

10. A propellant composition consisting essentially of the mixture of claim 1 as a base propellant wherein said fuel component is a saturated aliphatic hydrocarbon.

11. A propellant composition consisting essentially of the mixture of claim 1 as a base propellant wherein said fuel component is an organic ketone.

12. A propellant composition consisting essentially of the mixture of claim 1 as a base propellant wherein said fuel component is a lower alkyl ether of saturated glycol.

13. A propellant composition according to claim 8 wherein: said nitroalkane is tetranitromethane; said fuel component is acetophenone; and said high energy additive is powdered aluminum.

14. A propellant composition according to claim 5 wherein: said nitroalkane is tetranitromethane; said fuel component is acetophenone; and said solid inorganic oxidizing salt is ammonium perchlorate.

15. A propellant composition consisting essentially of the mixture of claim 1 as a base propellant wherein said fuel component is acetophenone; said nitroalkane is tetranitromethane; and containing, in addition, up to 25 parts by weight per 100 parts by weight of said base propellant of a suitable burning rate catalyst.

16. A propellant composition according to claim 15 wherein: said burning rate catalyst is Milori blue.

17. A propellant composition according to claim 15 wherein: said burning rate catalyst is copper chromite.

18. A propellant composition consisting essentially of the mixture of claim 1 as a base propellant wherein said fuel component is a polyalkylene glycol formed by condensation of a saturated glycol containing from 2 to 3 carbon atoms; and containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

19. A propellant composition consisting essentially of the mixture of claim 1 as a base propellant wherein said fuel component is a polyalkylene glycol formed by condensation of a saturated glycol containing from 2 to 3 carbon atoms.

References Cited by the Examiner
UNITED STATES PATENTS
1,506,323   8/24   O'Neill.
2,530,493   11/50   Van Loenen.
2,690,964   10/54   Maisner.

FOREIGN PATENTS
582,621   11/46   Great Britain.

CARL D. QUARFORTH, Primary Examiner.
LEON D. ROSDOL, WILLIAM G. WILES, Examiners.